United States Patent [19]

Stephenson et al.

[11] 4,135,683

[45] Jan. 23, 1979

[54] SAFETY BELT RETRACTOR HAVING TWO REELS IN A COMMON HOUSING

[75] Inventors: Robert L. Stephenson, Sterling Heights; James Gavagan, Center Line, both of Mich.; Yogendra S. Loomba, Knoxville, Tenn.

[73] Assignee: Allied Chemical Corporation, Morris Township, Morris County, N.J.

[21] Appl. No.: 817,636

[22] Filed: Jul. 21, 1977

[51] Int. Cl.² .................. A62B 35/02; B65H 75/48
[52] U.S. Cl. ........................ 242/107.4 A; 280/747
[58] Field of Search .......... 242/107.4 R–107.4 E; 297/388; 280/744–747

[56] References Cited

U.S. PATENT DOCUMENTS

| 3,960,339 | 6/1976 | Fisher | 242/107.4 R |
|---|---|---|---|
| 3,974,979 | 8/1976 | Fieni | 242/107.4 R |
| 4,040,576 | 8/1977 | Walker et al. | 242/107.4 A |
| 4,065,070 | 12/1977 | Pilarski et al. | 242/107.4 A |

*Primary Examiner*—Harvey C. Hornsby
*Assistant Examiner*—John M. Jillions

*Attorney, Agent, or Firm*—R. H. Criss; P. L. Henry

[57] ABSTRACT

A safety belt retractor comprises a housing containing first and second tandem spools for storing, respectively, lap and shoulder belts in helical wrap. Each of the spools is secured to a ratchet wheel engageable by a pawl located in the housing between the spools. Pawl support openings formed in opposite sidewalls of the housing enable the pawl to float while pivoting. In an equilibrium position, clearance between one end of the floating pawl and the first ratchet wheel is less than the clearance between the opposite end of the pawl and the second ratchet wheel. In response to acceleration of the vehicle carrying the retractor housing, a pendulum-type inertia device pivots the pawl from equilibrium into engagement with the first ratchet wheel. During pay out of the belts, with one end pivoting on the first ratchet wheel, the floating pawl is guided into contact with the second ratchet wheel by a cam surface defining one of the sidewall openings to positively lock the two spools. The pawl is supported by a plastic support member. The entire assembly is formed of interlocking parts.

16 Claims, 10 Drawing Figures

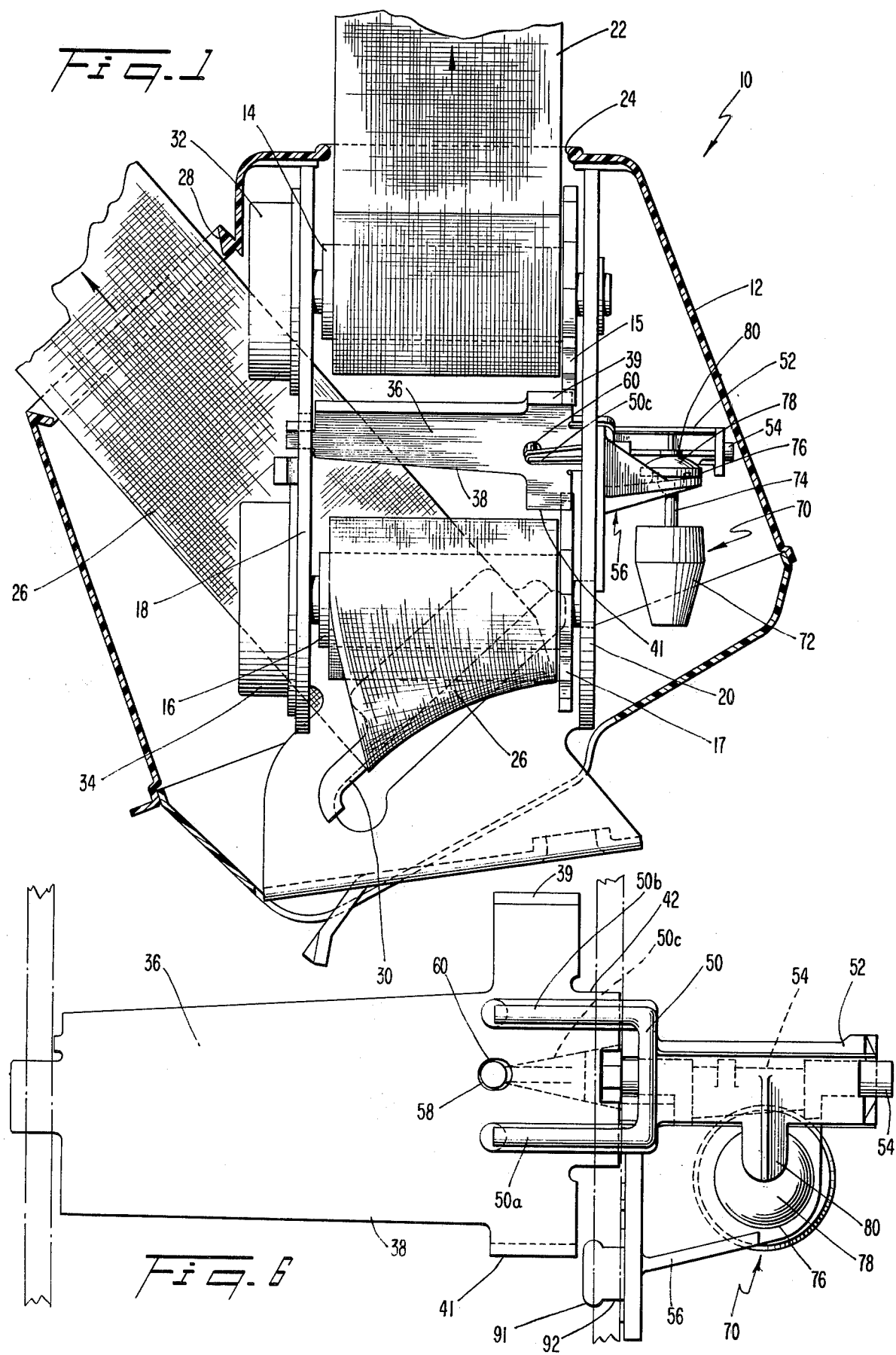

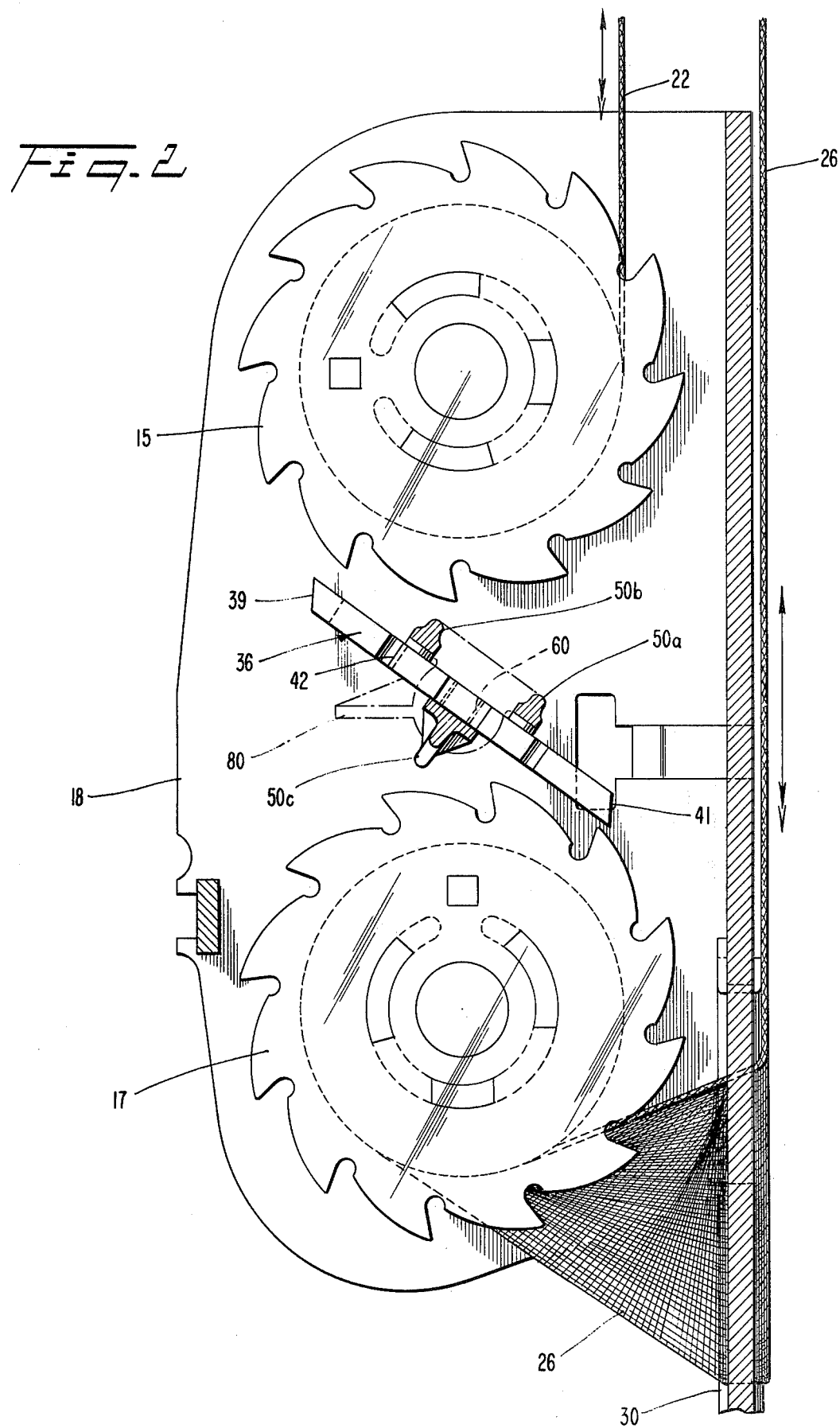

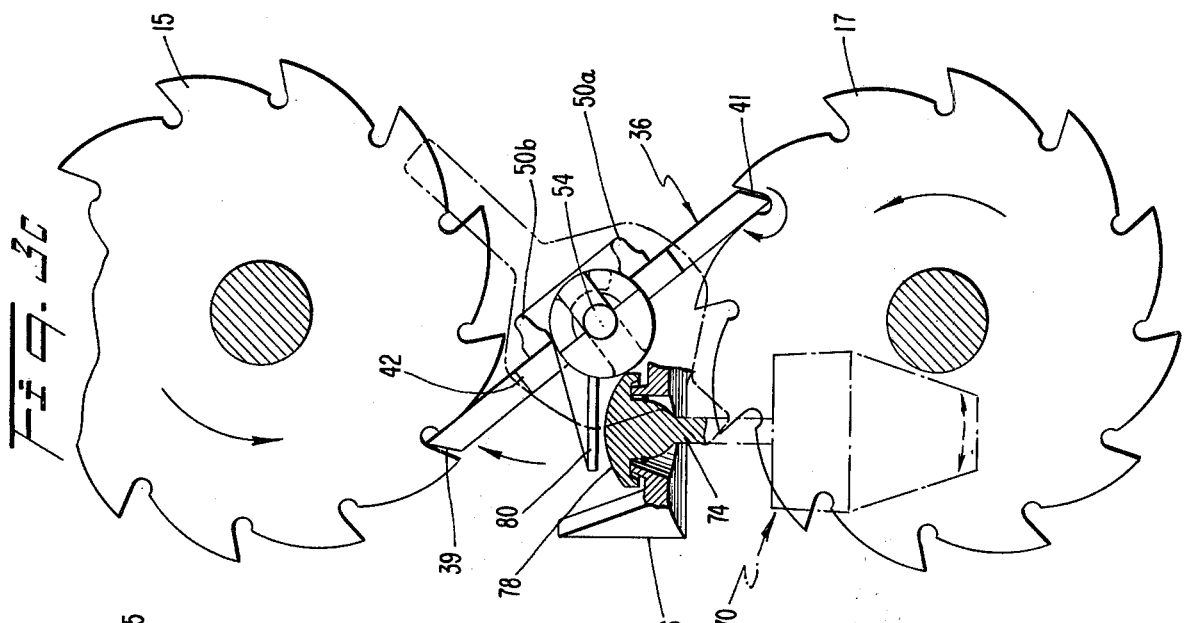
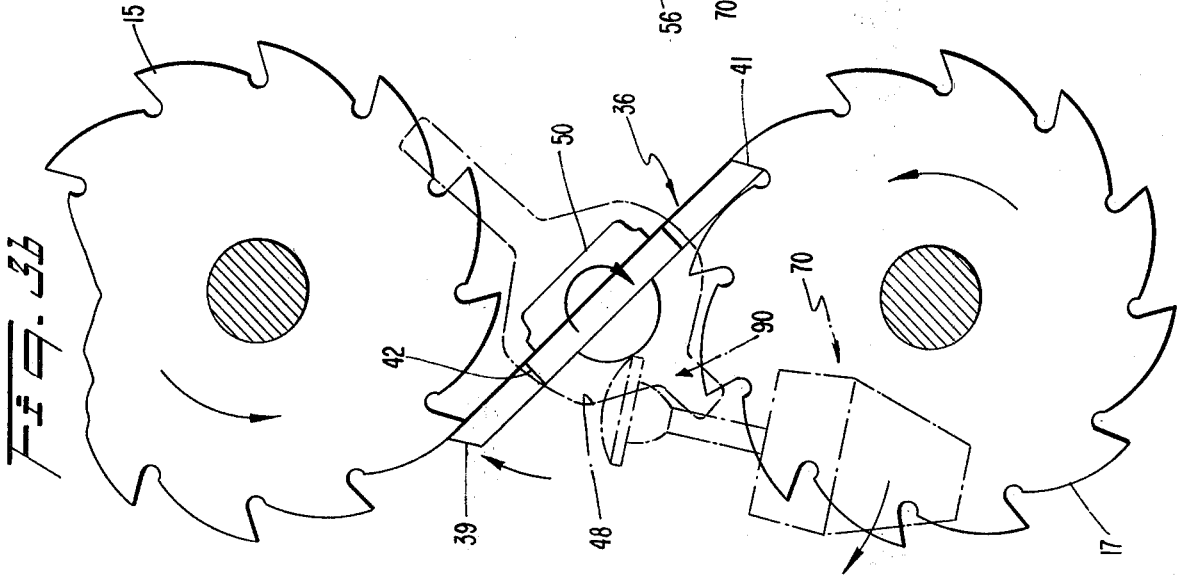
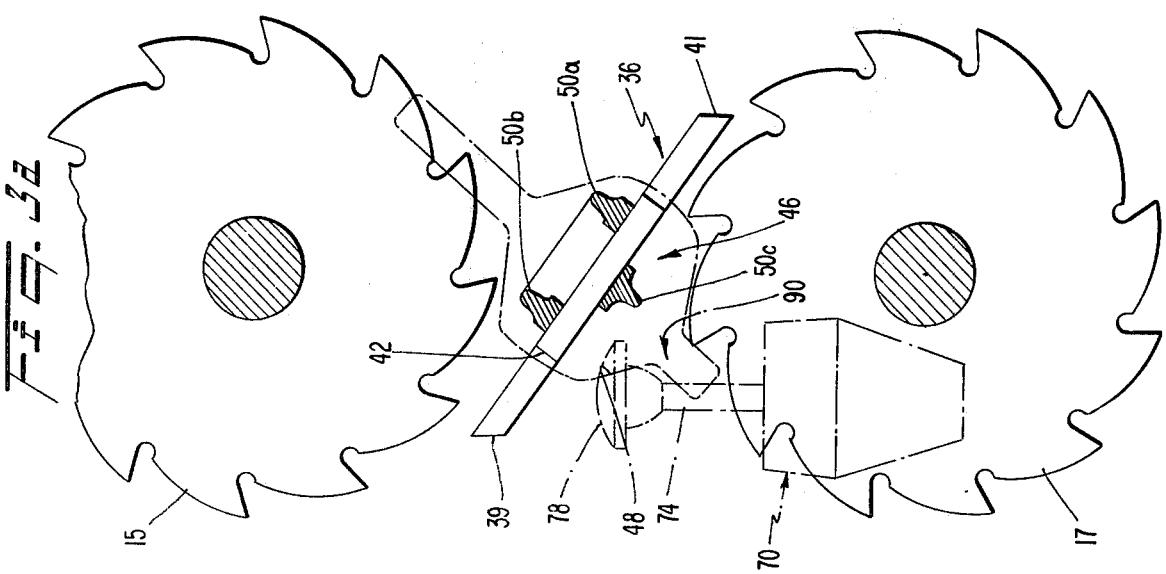

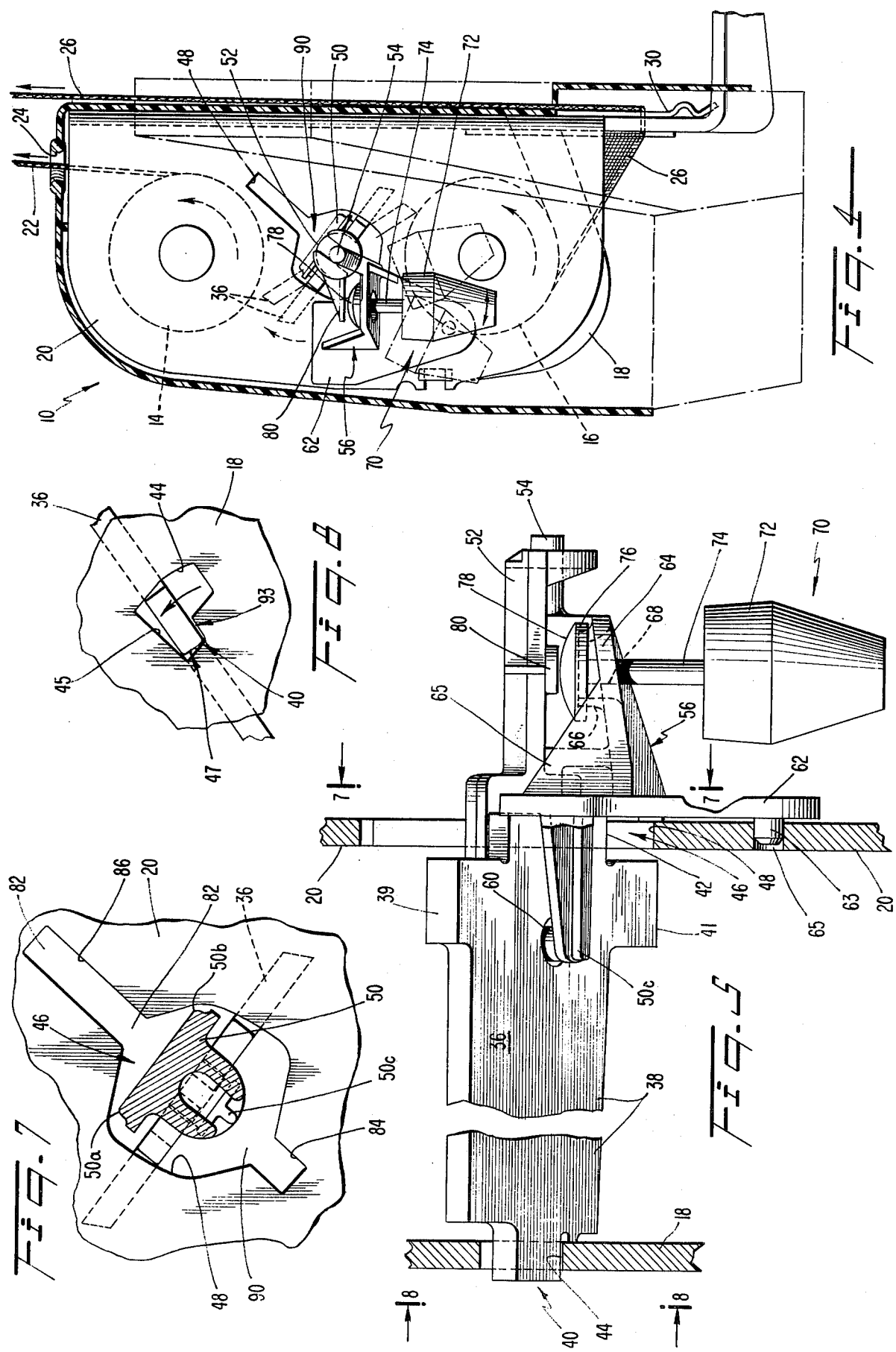

SAFETY BELT RETRACTOR HAVING TWO REELS IN A COMMON HOUSING

BACKGROUND OF THE INVENTION

1. Field of the Invention

The present invention relates generally to a safety belt retractor, and more particularly, toward safety belt retractors having a lap belt and a shoulder belt in a single housing, wherein locking of both belts is responsive to vehicle acceleration forces acting on a single sensor.

2. Description of the Prior Art

In a typical safety belt system for a vehicle, retractable lap and shoulder belts are provided to secure a passenger in position on a seat in the event of collision. When not in use, the lap and shoulder belts are retracted by spiral wound helical-type springs and stored in helical wrap in separate safety belt retractor mechanisms. The lap belt retractor is generally positioned adjacent one side of the passenger, for example on the floor, and the shoulder belt retractor is located behind the occupant for example on the pillar or on the roof of the vehicle. The free ends of the lap and shoulder belts may be connected together for coupling to a common buckle or belt receptacle positioned on the seat at the opposite side of the passenger.

In early safety belt retractors, the length of the safety belt is manually adjusted by each passenger prior to use using a belt take-up device. In order to provide a safety belt retractor that accomodates all passengers without the need for individual length adjustment, vehicle inertia responsive retractors have been developed. In these retractors, a belt spool is continuously spring-biased in a retracting direction and one end of the spool has a set of ratchet teeth adapted to engage with a pawl for locking the spool against belt withdrawal. During normal driving, the pawl is maintained separated from the ratchet by a vertically suspended pendulum-type inertia device. In response to excessive acceleration of the vehicle, that is, sharp increases or decreases in speed or sharp cornering, the pendulum pivots the pawl into engagement with the ratchet teeth on the spool preventing pay out of the belt.

While the inertia responsive lap and shoulder belt retractors have been generally satisfactory, the provision of two separate safety belt retractors has increased cost and has required additional space utilization. In order to minimize costs and to free up the space occupied by the second retractor, it has been proposed to mount both the lap and shoulder belt in a single housing. In U.S. Pat. No. 3,974,979 to Fieni, a single pawl is positioned between a pair of spools in tandem carrying the lap and shoulder belts. The pawl is pivotably supported within the housing equispaced between the spools, and is operative to engage a set of ratchet teeth on each spool. Engagement and disengagement of the pawl are manually controlled by the passenger; the retractor is not vehicle inertia responsive.

Accordingly, there exists a need for a lap and shoulder belt retractor wherein locking and unlocking of the belts are automatically controlled in response to vehicle acceleration. In order to reduce costs, there exists a further need for such a retractor wherein only a single inertia responsive device is operative with both belts.

One object of the present invention, therefore, is to provide a tandem spool, vehicle responsive inertia retractor for storing the lap and shoulder belts.

Another object of the invention is to provide a new and improved lap and shoulder retractor that accomodates passengers without requiring manual length adjustment.

Another object of the invention is to provide a new and improved retractor for both the lap and shoulder safety belts, wherein the lap and shoulder belts are stored within a single housing and the belts are locked against withdrawal by a common inertia responsive device.

SUMMARY OF THE INVENTION

A vehicle safety belt retractor for the lap and shoulder belts, in accordance with the present invention, comprises a housing; first and second spools journalled in the housing for storing, respectively, first and second safety belts in helical wrap, each of the belts adapted to be manually withdrawn from the housing; spring means for biasing the spools toward a fully wound condition; first and second ratchet wheels secured, respectively, to the spools; a single pawl positioned between the first and second ratchet wheels and having opposite ends operative to engage the ratchet wheels; an inertia device responsive to acceleration of a vehicle carrying the housing to pivot the pawl into engagement with the first ratchet wheel; and means for supporting the pawl inside the housing about a floating pivot point for positively locking both of the spools against rotation. In an equilibrium position, during normal driving, clearance between one end of the pawl and first ratchet wheel is smaller than the clearance between the opposite end and the second ratchet wheel so that during pivoting, there is a tendency for engagement by the pawl with the first ratchet wheel followed by engagement with the second ratchet wheel.

The pawl is in the form of a flat, metal member supported within the housing in openings formed on the two sidewalls so as to "float" between the ratchet wheels, that is, to be capable of linear shifting as well as pivotal movement. One of the pawl support openings is approximately L-shaped to accomodate assembly and pivoting of the pawl between the ratchet wheels. The other opening has an approximately hexagonal shape with opposite halves spaced apart by a slot corresponding in configuration to the thickness and width of the pawl. Access to the pawl into the housing during assembly is made through the slot. The lip defining the hexagonal opening functions as a cam surface to laterally guide the floating pawl for positively locking both ratchet wheels and spools against pay out of the safety belts.

A plastic pawl support member is coupled to one end of the pawl and located centrally in the hexagonal opening. The pawl support member includes a plurality of plastic, resilient fingers disposed on opposite sides of the pawl which converge to a supporting sleeve that extends outwardly from the housing sidewall and is journalled on a stationary plastic shaft, part of a holding bracket which is fixed to the vertical flange of the housing.

The inertia responsive device comprises pendulum having a vertical shaft that extends through the holding bracket attached to the housing. The upper end of the shaft has a dome-shaped actuator seated on a raised collar formed on the bracket.

Attached to the supporting sleeve is a transverse arm that abuts the center of the dome-shaped actuator. The pawl is maintained by the actuator in an equilibrium position, during normal driving, with the pendulum extending vertically. In the event of excessive acceleration or deceleration of the vehicle, the ratchet wheels tend to rotate in response to pay out of the lap and shoulder belts. The pendulum pivots away from the vertical, and the dome-shaped actuator lifts the transverse arm to pivot the supporting sleeve and fingers, together with the pawl. The latter is caused to pivot into early engagement with the first ratchet wheel due to short pawl-to-first ratchet wheel clearance. The pawl, while pivoting on the first ratchet wheel, is guided laterally by the hexagonal shaped cam surface into engagement with the second ratchet wheel. With the pawl engaged with both of the ratchet wheels, the lap and shoulder belt spools are both positively locked. Upon termination of the acceleration or deceleration, the pawl is released by release of tension on the belts. The pendulum swings back into the equilibrium position between the ratchet wheels, and the device is automatically reset.

Still other objects, advantages and features of the present invention will become readily apparent to those skilled in this art from the following detailed description wherein we have shown and described only the preferred embodiments of the invention, simply by way of illustration of the best modes contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 1 is a cross sectional front view of the double spool safety belt retractor, in accordance with the invention, showing the pawl and pendulum supported on vertical sidewalls of the housing;

FIG. 2 is a cross sectional side view of the retractor showing the pawl in an equilibrium position between the upper and lower ratchet wheels;

FIGS. 3a–3c are schematic views of the pawl and the ratchet wheels during successive operating stages; in FIG. 3a, the pawl is in an equilibrium position between the upper and lower ratchet wheels; in FIG. 3b, the pendulum has pivoted the pawl into engagement with the lower ratchet wheel, the upper end of the pawl being in an interference mode with the upper ratchet wheel; and in FIG. 3c, the pawl has been laterally guided into positive engagement with the upper ratchet wheel;

FIG. 4 is a cross sectional side view of the retractor showing the operation of the pendulum-type inertia responsive device during vehicle acceleration;

FIG. 5 is a partial cross sectional view of the retractor showing a detail of the pawl and pendulum assembly;

FIG. 6 is a detail of the pawl and pawl support member showing the snap fit coupling between the support member finger and corresponding pawl aperture;

FIG. 7 is a detail of the camming surface defining the hexagonal shaped sidewall opening; and FIG. 8 is a detail of the opposite sidewall opening.

DETAILED DESCRIPTION OF THE PREFERRED EMBODIMENT

Referring to FIG. 1, a safety belt retractor, identified generally by the numeral 10, comprises a plastic cover 12, enclosing upper and lower spools 14 and 16 carrying, respectively, a shoulder safety belt 22 and a lap safety belt 26 in helical wrap. The spools 14 and 16 are journalled on vertical, metal sidewalls 18 and 20 disposed within the cover 12. Shoulder belt 22 is adapted to be withdrawn from cover 12 through opening 24, and lap belt 26 is adapted to be withdrawn through opening 28. The lap belt 26 is guided angularly by guide member 30 through the opening 28 for extension across the lap of the passenger. The cover 12 is anchored to the housing by suitable means, not shown.

The upper spool 14 for shoulder belt 22 is spring-biased so as to return the belt fully retracted by a first helical spring 32, and the lower spool 16 is similarly spring-biased by a second spring 34. The springs 32 and 34 are positioned on the same ends of the spools 14 and 16 because the belts 22 and 26 are wound onto the spools in the same directions so that the spools are spring-biased in the same for retraction.

Referring to FIGS. 1 and 6, pawl 36, preferably formed of sheet metal, comprises an elongated body portion 38 having working ends 39 and 41 as well as supporting ends 40 and 42. Working ends 39 and 41 are adapted to engage ratchet wheels 15 and 17 secured, respectively, to corresponding ends of spools 14 and 16. The end 40 of pawl 36 is supported to sidewall 18 in sidewall opening 44, as shown in FIG. 5. At the opposite end 42 of the pawl 36, a plastic pawl support member 46 is coupled to the pawl and is located in opening 90 of sidewall 20. The end 42 of pawl 36 is thus radially spaced from the lip of sidewall opening 90 by the plastic support member (mounted on the support bracket shaft) preventing metal-to-metal contact except under load.

The plastic pawl support member 46 comprises first and second resilient tines or fingers 50a and 50b, together with an opposed third finger 50c, as best shown in FIG. 6. The three fingers 50a–50c branch out from a common sleeve 52 extending outwardly from sidewall 20. Sleeve 52 is journalled on a stationary shaft 54. The shaft 54 is formed on pendulum holding bracket 56 attached to sidewall 20.

At the end of the finger 50c, there is provided a locking tab 58 which retains the support member 46 to the pawl 36 by extending into cooperating pawl aperture 60 (FIG. 6). The finger being resilient, snap fits into place with the tab 58 located within the aperture 60, as shown; the resilience of the fingers 50c also enables yielding to lateral movement of the floating pawl 36.

Because the fingers 50a–50c are centered in sidewall opening 90, there is no contact between the pawl 36 and the sidewall. This is important for preventing brinelling since, as aforementioned, there is no metal-to-metal contact, except under load.

Pendulum holding bracket 56 comprises a plate member 62 adapted to abut sidewall 20, as shown in FIG. 5, integrally formed with platform 64 and the stationary shaft 54. The plate member 62 is located in position on sidewall 20 by locating tabs 63 and 91 into sidewall apertures 65 and 92 respectively. Platform 64, extending outwardly from sidewall 20, is reinforced on opposite sides thereof by member 91 for supporting a pendulum-type, inertia responsive device 70 (member 91 is shown in FIG. 6). On the upper face of the platform 64, there provided a stationary collar 66 through which is formed an axial bore 68.

The pendulum-type inertia responsive device 70 comprises a mass 72 attached to the lower end of a pendulum shaft 74 extending through bore 68 of stationary collar 66. At the upper end of the shaft 74, there is provided a dome-shaped actuator 76 seated on the collar. The upper surface of the actuator 76 has a spherical surface 78, as best shown in FIGS. 5 and 3c.

Located at the center of the surface 78 of actuator 76 is an arm 80 extending radially from sleeve 52. Arm 80 is operative to pivot pawl 36 via supporting sleeve 52 in response to pivoting of the pendulum mass 72. In steady state, with the pendulum 72 extending vertically downwardly, as shown in FIG. 5, the arm 80 is disposed in the center of surface 78 to maintain the sleeve 52 together with pawl 36 in an equilibrium position. During excessive acceleration of the vehicle, on the other hand, the pendulum device 72 is displaced from the vertical, as shown in FIG. 4. By the term "acceleration" it is meant any change in speed or direction of the vehicle. Any displacement from the vertical by pendulum shaft 74 causes the arm 80 of sleeve 52 to be lifted by the surface 78 of actuator 76, whereby the sleeve 52 is caused to rotate about stationary shaft 54. Any rotation of sleeve 52 about the shaft 54 causes corresponding pivoting of the pawl 36 via the pawl support fingers 50a-50c.

Referring now to FIG. 2, with pawl 36 in an equilibrium position, that is, when the inertia device is in a vertical position (see FIG. 5), the pawl being centrally located in the sidewall opening 90, the clearance between the pawl and the lower spool 16 is less than the clearance between the pawl and the upper spool 14. For example, the former clearance may be 0.020 inch whereas the latter may be 0.080 inch. As a result, pawl 36 will always engage the more important ratchet wheel 17 (lap belt) first in response to clockwise pivoting of pawl 36 followed by engagement with upper ratchet wheel 15. Pivoting of pawl 36 is always clockwise since the arm 80, wich is lifted by the actuator 76, is positioned on support sleeve 52 on a left-hand portion of the pawl, as shown in FIG. 2, Lifting of the arm 80 causes the upper working end 39 of the pawl to swing around clockwise, forcing the lower working end 41 of the pawl into engagement with ratchet wheel 17.

Referring now to FIG. 7, opening 90 formed in sidewall 20, is approximately hexagonal in shape, with opposite halves of the opening being separated by a slot 82. The lip 48 of the opening 90 forms a cam surface for guiding linear movement of the floating pawl 36 when under load from ratchet wheel 17. This camming action shall be discussed in detail below in connection with FIGS. 3a-3c. Slot 82 includes a first portion 84 together with a second, longer portion 86 corresponding to operative ends 41 and 39, respectively, of pawl 36 (see FIG. 1). The purpose of the slot 82 is to permit insertion of the pawl 36 through sidewall 20 during assembly, as also described in more detail below.

Referring to FIG. 8, opening 44 formed in opposite sidewall 18, is approximately L-shaped to accomodate pivoting of the pawl 36 together with limited linear movement applied to the floating end 42 of the pawl 36. In the equilibrium position, pawl 36 rests in the corner formed by surfaces 47 and 93 of opening 44. During pivoting of pawl 36 by inertia responsive device 70, the end 40 of the pawl pivots on lower surface 47 of the opening 44, as shown by the arrow, counter-clockwise.

Referring to FIGS. 3a-3c, the operation of the floating pawl shall now be described in more detail. FIG. 3a is similar to FIG. 2 with pawl 36 and pendulum-type inertia device 70 shown in the equilibrium position. The pawl support member 46 is located centrally in sidewall opening 90 by the position of stationary shaft 54 upon which the supporting sleeve 52 of the pawl support member 46 is journalled. In response to acceleration of the vehicle, the device 70 becomes displaced, as shown in FIG. 3b, resulting in clockwise pivoting of the floating pawl 36. Since there is less clearance between pawl 36 and lower ratchet wheel 17 than between the pawl and upper ratchet wheel 15, engagement between the pawl and lower ratchet wheel is established, as shown, ensuring early locking of the more important lap belt, prior to engagement between the pawl and upper ratchet wheel.

Positive engagement between the lower ratchet wheel 17 and pawl 36 is established even if the upper ratchet wheel 15 is positioned in an interference mode with the pawl, as shown in FIG. 3b, wherein the pawl is pivoted into abutment with the outer diameter of the wheel 15, and full engagement with wheel 17 is accomplished by virtue of the flexture of the plastic fingers. The floating characteristic of the pawl 36, whereby the floating end 42 of the pawl is permitted to shift linearly with respect to the pivot point while pivoting, is an important aspect of this invention because the belts typically do not pay out simultaneously following an impact, but there must nevertheless be positive engagement of both ratchet wheels 15, 17. Positive engagement of both wheels 15, 17 by pawl 36 must occur even if wheel 15 is momentarily in interference with the pawl.

Assume first, however, that there is simultaneous pay out of the shoulder belt 22 and lap belt 26 causing counterclockwise rotation of ratchet wheels 15 and 17, as shown in FIG. 3c. End 41 of pawl 36 is pivoted into engagement with lower ratchet wheel 17, as explained above. Since ratchet wheel 17 is rotating counterclockwise, the pawl 36 is shifting upwardly toward ratchet wheel 15 with the lower end 41 riding on a floating pivot point about wheel 17. As pawl 36 is shifting, it is being guided by the cam surface 48 into engagement with ratchet wheel 15. The resilient finger 50c yields to the lateral thrust applied to the pawl 36 by the lower ratchet wheel 17 to permit the linear shifting. Since the upper and lower ratchet wheels 15 and 17 rotate in the directions shown by the arrows in FIG. 3c, there is positive engagement of both of the wheels by the pawl 36 thereby preventing further rotation of the corresponding spools 14 and 16, and pay out of the shoulder and lap belts 22 and 26, respectively.

Because pawl 36 is able to "float" within the opening 90 while pivoting on lower ratchet wheel 17, there will be positive engagement between the pawl and ratchet wheel 15 even if its rotation is delayed momentarily following a vehicle impact, for example. Thus, assuming now that upon vehicle impact, the lap belt 26 begins to pay out first, there will initially be rotation of only lower ratchet wheel 17, together with clockwise pivoting of pawl 36. The lower end 41 of the pawl 36 engages the lower ratchet wheel 17, even if the upper end 39 is in an interference mode with the upper wheel 15 (this is shown in FIG. 3b), due to smaller clearance between the pawl and the lower ratchet wheel. Rotation of the lower wheel 17 provides a lifting action to the pawl 36, and linearly shifts the pawl, guided by the cam surface 48, into positive engagement with the upper ratchet wheel 15.

The floating pivot point action and operation of the retractor are as follows. In an equilibrium condition, as shown in FIG. 3a, the pawl is located on its small end in the L-shaped opening in member 18. On its large end it is centrally located in the hexagonal opening of member 20 by the dog support 46 which is mounted on the centrally located shaft of support bracket 56. Since the center of gravity of the pawl is off center, causing the pawl to have a gravitational attraction in the counterclockwise direction, the angular position of the pawl is determined by the pawl support arm 80 resting on the actuator surface 78.

Under rough road conditions, where the pendulum joggles about (with no belt pay out), the pawl will flutter in a rotary motion only, in response to the lifting of actuator surface 78 and the resultant rotation of pawl support arm 80. Cessation of pendulum motion will allow gravitational force to return the pawl to the position of equilibrium shown in FIG. 3a.

At impact, with pay out of seat belt only as shown in FIG. 3b, a variety of sequential motions of the pawl takes place. First there is a clockwise rotary motion until the pawl contacts the outer diameter of the upper ratchet wheel, having moved, for example, 0.080 inch at the engageable end 39. The end 41 has also moved 0.080 inch, for example, and is now at an engageable depth of 0.060 inch, for example, with the lower ratchet wheel. As the latter rotates due to belt pay out and contacts the end 41 at the 0.060 inch depth point, for example, the pawl will be driven in a leftward direction, pivoting about the 0.060 inch contact point with the end 39 sliding along its contact point with the upper gear until the working surface 42 of the pawl contacts the cam surface 48. During this movement the pawl support 46 has a slight rotary motion with leftward flexture of the lower (center) finger which fits into aperture 60 of the pawl.

The next motion will be a full depth engagement of the pawl end 41 with the lower ratchet wheel, with the pawl pivoting about the contact point of end 39 with the upper ratchet wheel. The dog support 46 will again have a slight rotary motion with flexture of the center finger in a radial direction.

As the shoulder belt pays out causing rotation of the upper ratchet wheel, the pawl will be driven along cam surface 48 under load of the lower ratchet wheel until full depth engagement with the upper ratchet wheel is accomplished. During this movement the pawl pivots about the contact point of end 41 with the lower ratchet wheel, which point is moving circumferentially in a counterclockwise direction. The dog support 46 has again a slight rotary motion, with the two upper fingers under flexture in a direction perpendicular to the plane of the pawl contact surface, and the center finger having a corresponding motion as well as a leftward flexture as the pawl follows the cam surface. The above resultant condition obtains as long as the pull on the lap belt exceeds that on the shoulder harness.

The retractor 10 is assembled by first inserting pawl 36 into slot 82 and then coupling together support member 46 onto shaft 54 of support bracket 56 after which opposing pawl support fingers 50a–50c are straddled onto pawl 36 through hexagonal opening 90 until finger tab 58 slips into place within corresponding pawl aperture 60. The finger 50c is retained within the aperture 60 by longitudinal rib 59, but the finger remains resilient to yield to the thrust applied through the pawl by the ratchet wheel 17. The pawl and support assembly is now located on sidewall 20 by securing tabs 91 and 63 into openings 92 and 65 respectively, at which time the pawl 36 is rotated clockwise to capture the pawl between the sidewalls 18 and 20 and arm 80 is positioned in the center of surface 78 formed on the actuator 76 (see FIG. 5), with the pawl in the equilibrium position.

In this disclosure, there is shown and described only the preferred embodiment of the invention, but, as aforementioned, it is to be understood that the invention is capable of other and different embodiments, and its several details are capable of various obvious modifications, all without departing from the inventive spirit thereof.

What is claimed is:

1. A vehicle safety belt retractor apparatus, comprising:

a housing;

first and second spools journalled in said housing for storing, respectively, first and second safety belts in helical wrap, each of said belts adapted to be manually withdrawn from said housing;

spring means for biasing said spools toward a fully wound condition;

first and second ratchet wheels secured, respectively, to said spools;

a single pawl positioned between said first and second ratchet wheels and having opposite ends operative to engage said ratchet wheels; means for supporting said pawl inside said housing about a floating pivot point which permits pivotal and linear shifting motion of said pawl;

an inertia device responsive to acceleration of a vehicle carrying said housing to pivot said pawl into engagement with said first ratchet wheel; and whereby said pawl is shifted by limited rotation of said first ratchet wheel into engagement with said second ratchet wheel, thereby positively locking both of said spools against rotation.

2. The apparatus of claim 1, wherein said first and second ratchet wheels have teeth which move in opposite directions relative to said pawl in response to withdrawal of said belts.

3. The apparatus of claim 1, wherein said first and second safety belts include, respectively, lap and shoulder belts.

4. The apparatus of claim 1, wherein said support means includes a cam surface for guiding said pawl linearly into engagement with said second ratchet wheel while pivoting about a pivot point established with said first ratchet wheel.

5. The apparatus of claim 4, wherein said pawl is supported on opposite sidewalls of said housing, opposite supporting ends of said pawl being located respectively in first and second sidewalls openings.

6. The apparatus of claim 5, including a pawl support member and an end portion of said pawl being coupled to the support member, said support member includes a plurality of fingers disposed on opposite sides of said pawl.

7. The apparatus of claim 6, wherein said support member fingers extend through said first sidewall opening, said first sidewall opening defining the cam surface for linearly guiding said pawl.

8. The apparatus of claim 7, wherein said first opening has an approximately hexagonal shape, opposite halves of said first opening being separated by a slot adapted to receive said pawl.

9. The apparatus of claim 8, wherein said second opening has an approximately L-shaped configuration to accomodate assembly and pivoting of said pawl.

10. The apparatus of claim 7, wherein said fingers are resilient to yield to linear movement of said pawl.

11. The apparatus of claim 1, including means for establishing an equilibrium position of said pawl with a distance between said pawl and said first ratchet wheel being less than a distance between said pawl and said second ratchet wheel.

12. The apparatus of claim 11, wherein said equilibrium position establishing means includes a transverse arm coupled to said pawl, said arm being an abutment with said inertia responsive device to establish the equilibrium position, and pivoting said pawl in response to acceleration.

13. The apparatus of claim 12, wherein said inertia responsive device is mounted on a holding bracket removably attached to said housing.

14. The apparatus of claim 7, wherein a finger of said pawl support member includes a tab, said pawl containing an aperture for receiving said tab.

15. The apparatus of claim 7, wherein said fingers are formed of a plastic material.

16. The apparatus of claim 1, wherein said supporting means includes means for guiding said pawl linearly into engagement with said second ratchet wheel with said pawl pivoting about a pivot point established on said first ratchet wheel.

* * * * *